UNITED STATES PATENT OFFICE.

OLIVER KAMM AND ROGER ADAMS, OF URBANA, AND ERNEST H. VOLWILER, OF CHICAGO, ILLINOIS, ASSIGNORS TO THE ABBOTT LABORATORIES, OF CHICAGO, ILLINOIS, A CORPORATION OF ILLINOIS.

ANESTHETIC COMPOUND.

1,358,750.     Specification of Letters Patent.      Patented Nov. 16, 1920.

No Drawing.      Application filed January 23, 1920. Serial No. 353,612.

*To all whom it may concern:*

Be it known that we, OLIVER KAMM and ROGER ADAMS, residing at Urbana, in the county of Champaign and State of Illinois, and ERNEST H. VOLWILER, residing at Chicago, in the county of Cook and State of Illinois, all citizens of the United States of America, have invented certain new and useful Improvements in Anesthetic Compounds, of which the following is a specification.

Our invention relates to the production of di-n-butyl amino alcohol esters of aromatic acids.

*General method of synthesizing compounds of this series.*

Benzoyl chlorid or a substituted benzoyl chlorid is dissolved in benzene and treated with a molecule of a di-n-butyl-amino alcohol and the mixture refluxed about an hour; the reaction mixture is then treated with dilute acid in order to dissolve all the basic compounds and the aqueous layer made alkaline with sodium hydroxid. This precipitates the di-n-butyl amino alcohol ester of the benzoic acid used, which can be extracted and dissolved in hydrochloric acid in order to produce the salt.

*A specific compound.*

A specific compound belonging to the general series as above defined is the β-di-n-butyl amino ethyl alcohol ester of p-amino benzoic acid. This compound may be prepared by the general process described above. In benzene as a solvent, one gram molecule of p-nitrobenzoyl chlorid is added to one gram molecule of β-di-n-butyl amino ethyl alcohol and the mixture refluxed an hour on a water bath. (Di-n-butyl amino ethyl alcohol, which has not yet been described in the literature, is readily formed by the condensation of ethylene chlorhydrin and di-n-butyl amin and boils 225-230° at atmospheric pressure with slight decomposition). The reaction mixture is then shaken with dilute hydrochloric acid and the aqueous layer treated with tin and, if necessary, a little more hydrochloric acid. The temperature should be kept at about 50° so that the minimum amount of hydrolysis will take place. When no more heat is evolved, due to the reaction, heat is applied to maintain the temperature at 50° C. for about one-half hour longer. The solution is poured off from the excess tin, diluted with water and freed from tin by means of hydrogen sulfid. Upon filtering off the tin sulfid and making alkaline, the di-n-butyl amino ethyl ester of p-amino benzoic acid separates out. This is extracted and then treated with one molecule of hydrochloric acid. In this way, the monohydrochlorid is produced which crystallizes from water in white crystals, melting at 170-172° By using other acids for dissolving the base, other salts are produced.

Another specific member belonging to this series is the gamma-di-n-butyl amino propyl alcohol ester of para-amino benzoic acid, the hydrochlorid of which melts at 104-105° C.

The di-n-butyl amino alcohol esters of aromatic acids above specified are either liquid compounds or low-melting solids. They are insoluble in water but readily soluble in ether. All of these bases, as well as their various salts, possess anesthetic properties. When heated with an aqueous solution of alkali they undergo decomposition yielding di-n-butyl amino alcohols and salts of the aromatic acids.

The scope of the invention should be determined by the language of the appended claims which should be interpreted as broadly as possible consistent with the state of the art.

We claim as our invention:

1. As a new article of manufacture, a compound having the general formula:

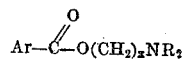

where Ar represents an aryl group containing a benzene nucleus, where X represents at least one, and where R represents an n-butyl group.

2. As a new article of manufacture, di-n-butyl amino alcohol ester of an aromatic acid containing a benzene nucleus.

3. As a new article of manufacture, the β-di-n-butyl amino ethyl ester of p-amino benzoic acid, a compound possessing the structure:

$$(P)H_2NC_6H_4COOCH_2CH_2N(C_4H_9)_2$$

4. As a new anesthetic compound, the β-di-n-butyl amino ethyl ester of p-amino benzoic acid which is a low-melting solid forming a monohydrochlorid melting at 172° C.

OLIVER KAMM.
ROGER ADAMS.
ERNEST H. VOLWILER.